(12) United States Patent
Sambongi

(10) Patent No.: US 8,259,197 B2
(45) Date of Patent: Sep. 4, 2012

(54) IMAGING DEVICE

(75) Inventor: Shinsuke Sambongi, Wako (JP)

(73) Assignee: Nikon Corporation, Tokyo (JP)

( * ) Notice: Subject to any disclaimer, the term of this patent is extended or adjusted under 35 U.S.C. 154(b) by 457 days.

(21) Appl. No.: 12/385,579

(22) Filed: Apr. 13, 2009

(65) Prior Publication Data

US 2009/0262224 A1 Oct. 22, 2009

(30) Foreign Application Priority Data

Apr. 21, 2008 (JP) .................................. 2008-109936

(51) Int. Cl.
*H04N 9/64* (2006.01)

(52) U.S. Cl. ..................... 348/243; 348/230.1; 348/364

(58) Field of Classification Search ............... 348/222.1, 348/223.1, 229.1, 230.1, 241, 243, 244, 245, 348/362, 364
See application file for complete search history.

(56) References Cited

U.S. PATENT DOCUMENTS

| | | | |
|---|---|---|---|
| 6,829,007 B1 | 12/2004 | Bilhan et al. | |
| 7,804,532 B2 * | 9/2010 | Takahashi et al. | 348/243 |
| 2004/0135922 A1 * | 7/2004 | Nakajima et al. | 348/362 |
| 2005/0046713 A1 | 3/2005 | Kato | |
| 2005/0099515 A1 | 5/2005 | Tsuruoka | |
| 2005/0242269 A1 | 11/2005 | Hayashi et al. | |
| 2006/0044424 A1 | 3/2006 | Shirai et al. | |

FOREIGN PATENT DOCUMENTS

| | | |
|---|---|---|
| EP | 1 156 673 A2 | 11/2001 |
| JP | A-2005-79948 | 3/2005 |
| JP | A-2007-174266 | 7/2007 |

OTHER PUBLICATIONS

Extended European Search Report for European Application No. 09005385.1, mailed on May 11, 2010.
May 15, 2012 European Search Report issued in EP 09 005 385.1.

* cited by examiner

*Primary Examiner* — Huy K Mai
(74) *Attorney, Agent, or Firm* — Oliff & Berridge, PLC

(57) ABSTRACT

An imaging device includes an imaging sensor, a switching section, and a controlling section. The imaging sensor includes a light receiving surface to which light receiving elements capable of addressing reading are arranged, and having, on the light receiving surface, an imaging area capturing a subject image and an optical black area outputting a signal of a dark current component, the optical black area which the light receiving elements are covered with a light shielding member. The switching section switching a first state and a second state. The controlling section reads a signal level by each partial area at the optical black area when a dark image is captured in the second state after capturing a normal image in the first state, sequentially compares with the signal level at a corresponding position of the normal image, and controls a exposure time of the dark image according to the comparison result.

20 Claims, 5 Drawing Sheets

IMAGING DEVICE

CROSS REFERENCE TO THE RELATED APPLICATIONS

This application is based upon and claims the benefit of priority from Japanese Patent Application No. 2008-109936, filed on Apr. 21, 2008, the entire contents of which are incorporated herein by reference.

BACKGROUND

1. Field

The present embodiments relate to an imaging device including a noise reduction process function removing noise generated when an exposure is performed for a long time.

2. Description of the Related Art

In recent years, an electronic camera having a noise reduction (NR) mode is known as the electronic camera including an imaging sensor (for example, refer to Japanese Unexamined Patent Application Publication No. 2005-79948). Generally, the electronic camera performs a dark imaging with an exposure time which is the same as an exposure time of a normal image under a state in which the imaging sensor is light shielded just after the normal image is photographed, in this noise reduction (NR) mode. Subsequently, a correction process of data of the normal image is performed by using data of the dark image inside the electronic camera. Image degradation such as a dark current noise generated at the imaging sensor and a minute scratch (for example, a point scratch) caused by a pixel defect unique to the imaging sensor is reduced by this correction process.

However, there are problems as stated below in the noise reduction (NR) mode. The dark current is generated by heat, and therefore, dark current amounts are different if temperature of the imaging sensor changes even if the exposure times are the same (the dark current amount becomes double caused by the temperature rise of 7° C. to 10° C.). Accordingly, an error occurs between respective dark current components if the temperature difference exists between a normal exposure time and a dark exposure time. There is a tendency that fluctuation of temperature becomes large and a dark current difference also becomes large as the exposure time becomes long.

Generally, when the imaging sensor is used continuously from the normal exposure to the dark exposure, the temperature rise of the imaging sensor is further incurred at the dark exposure time. The dark current also increases according to the temperature rise. As a result, a problem occurs in which the dark current is too much subtracted in the correction process to thereby incur a black saturation (excessive correction of dark level) and so on.

Besides, when a long time exposure is performed after a live view mode displaying a live video of the imaging sensor on a liquid crystal display is used for a long time, the long time exposure is started under a state in which the temperature rises up to a saturation temperature caused by the live view operation. In this case, power consumption is small and the temperature decreases rapidly because a mode shifts to a stand-by mode during the long time exposure. Accordingly, the dark current becomes small in the dark exposure than the normal exposure as it is opposite to the normal state. In this case, a problem occurs in which a black floating (shortage of correction of dark level) is incurred caused by a shortage of the correction amount in the correction process.

Further, it is known that the dark current noise such as a white point occurs when the exposure is performed for a long time. In this case, a problem occurs in which the white point remains if the dark current amounts are different between the normal exposure time and the dark exposure time.

Here, in the noise reduction (NR) mode disclosed in the Japanese Unexamined Patent Application Publication No. 2005-79948, it is estimated that the temperature rise occurs when an exposure time determined in advance has passed. However, there is a room for further improvement in a point that the correction cannot be performed enough when the predicted temperature rise does not occur actually.

SUMMARY

A proposition of the present embodiment is to provide an imaging device capable of preventing image degradation caused by a black saturation, a black floating, a white point, and so on even under an environment in which an exposure time becomes long or temperature changes, in consideration of the above-stated circumstances.

An imaging device includes an imaging sensor, a switching section, and a controlling section. The imaging sensor includes a light receiving surface to which light receiving elements capable of addressing reading are arranged, and having, on the light receiving surface, an image area capturing a subject image and an optical black area outputting a signal of a dark current component, the optical black area being an area in which the light receiving elements are covered with a light shielding member. The switching section switching a first state which a luminous flux is incident on the light receiving surface and a second state which prevents the incident of the luminous flux on the light receiving surface. The controlling section reads a signal level by each partial area at the optical black area when a dark image is captured in the second state after capturing a normal image in the first state, sequentially compares with the signal level at a corresponding position of the normal image, and controls a exposure time of the dark image according to the comparison result.

The controlling section reads the signal level of the optical black area by a line unit at every predetermined time, and compares with the signal level of a corresponding line of the normal image.

The controlling section finishes an exposure of the dark image when a value of the signal level read at the exposure time of the dark image becomes the value within an allowable range including a case when the value of the signal level is the same value as the signal level of the optical black area of the normal image.

The controlling section performs a correction process of a data of a normal image by using a data of a dark image.

DETAILED DESCRIPTION OF THE EMBODIMENTS

<Description of Constitution of Electronic Camera>

Hereinafter, embodiments of the present invention are described in detail based on the drawings.

Figure 1:
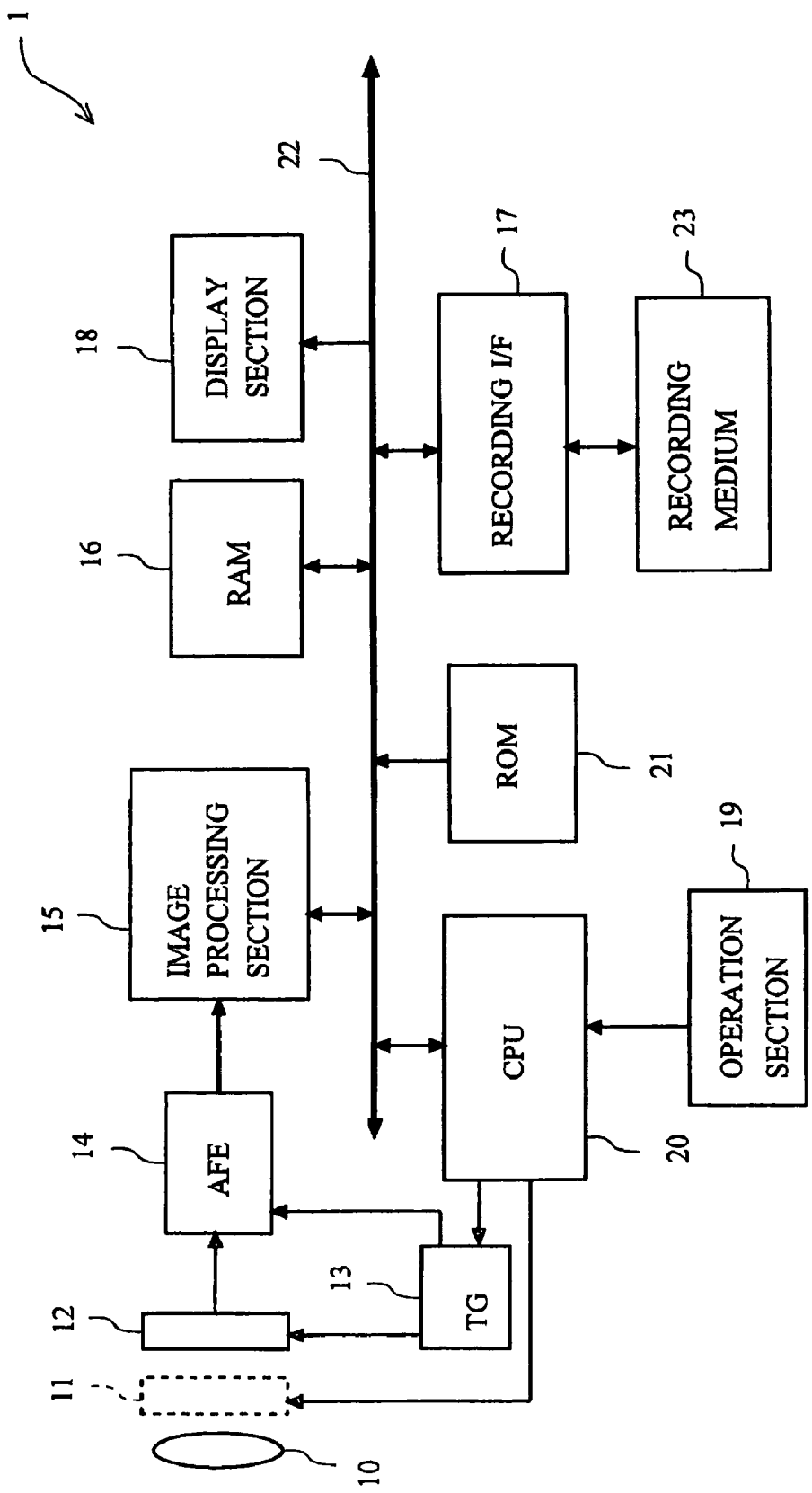
FIG. 1 is a block diagram explaining a constitution of an electronic camera of the present embodiment.

FIG. 1 is a block diagram explaining a constitution of an electronic camera of the present embodiment. As illustrated in FIG. 1, an electronic camera 1 includes a photographic optical system 10, a mechanical shutter 11, an imaging sensor 12, a timing generator (TG) 13, an analog front-end section (hereinafter, called as an "AFE") 14, an image 25 processing section 15, a RAM (Random Access Memory) 16, a recording interface (recording I/F) 17, a display section 18, an operation section 19, a CPU (Central Processing Unit) 20, a ROM (Read Only Memory) 21, and a bus 22. Among them, the image processing section 15, the RAM 16, the recording interface (recording I/F) 17, the display section 18, the CPU 20 and the ROM 21 are coupled with each other via the bus 22. Besides, the operation section 19 is coupled to the CPU 20.

The photographic optical system 10 is constituted by plural lens groups including a focus lens and a zoom lens. Incidentally, the photographic optical system 10 is illustrated as a piece of lens in FIG. 1 for simplicity. This photographic optical system 10 is controlled by a not-illustrated lens driving device.

The mechanical shutter 11 switches a first state in which a luminous flux is incident on the imaging sensor 12 and a second state in which the incident of the luminous flux on the imaging sensor 12 is prevented by opening and closing the shutter. This switching is performed by a mechanical shutter driving section (not illustrated) in response to an instruction of the CPU 20.

The imaging sensor 12 generates an image signal (analog signal) of a normal image by performing a photoelectric conversion of a subject image formed on an imaging surface thereof. Incidentally, in the present embodiment, a CMOS (Complementary Metal-Oxide Semiconductor) in an XY addressing method is used as the imaging sensor 12. Plural light receiving elements arranged in a matrix state are put in place at a light receiving surface of the imaging sensor 12. These light receiving elements can perform an addressing reading according to an instruction of the CPU 20. Besides, the light receiving surface of the imaging sensor 12 is constituted by an imaging area capturing an image and an optical black area (hereinafter, called as an "OB area"). In this OB area, the light receiving elements are covered with a light shielding member such as aluminum, and a signal of a dark current component is output.

The timing generator (TG) 13 transmits driving signals toward each of the imaging sensor 12 and the AFE 14 in accordance with the instruction from the CPU 20, to thereby control driving timings of both the imaging sensor 12 and the AFE 14.

The AFE 14 is an analog front-end circuit performing a signal process for the image signal generated by the imaging sensor 12. This AFE 14 performs a gain adjustment of the image signal, an A/D conversion of the image signal, and so on. The image signal (digital signal) output by the AFE 14 is input to the image processing section 15 as data of the normal image and data of the dark image.

The image processing section 15 stores the data of the normal image output from the AFE 14 into a frame memory of the RAM 16. Besides, the image processing section 15 stores signal levels of the OB area read at a later-described dark imaging time one line by one line with a predetermined interval into a line memory of the RAM 16. Besides, the image processing section 15 performs various image processes such as a white balance, a gradation conversion process for the data of the normal image after a later-described correction process is performed.

The recording interface (recording I/F) 17 provides a communication interface so as to enable a recording of the image data of the normal image into a recording medium 23.

The display section 18 displays various images in response to an instruction of the CPU 20. Further, the display section 18 displays a live video of the imaging sensor 12 in the above-stated live view mode.

The operation section 19 is a release button, a command dial, and so on, and gives a signal to the CPU 20 in response to operation contents by a user. For example, the user is able to give an instruction of photographing to the CPU 20 by fully pressing the release button.

The CPU 20 is a processor performing a total control of the electronic camera 1. The CPU 20 controls each section of the electronic camera 1 by executing sequence programs stored at the ROM 21 in advance.

Besides, the CPU 20 performs so-called a twice-shot NR photographing when the above-stated noise reduction (NR) mode is set to be turned on. Namely, the CPU 20 performs the dark imaging after the normal imaging is performed. At this time, the CPU 20 performs a control of a dark image exposure time, which differs from a twice-shot NR photographing of a conventional noise reduction (NR) mode (in which the exposure times of the normal image and the dark image are the same). The CPU 20 performs the correction process of the data of the normal image by using the data of the dark image (details will be described later).

<Operation Description of Electronic Camera>

Figure 2:
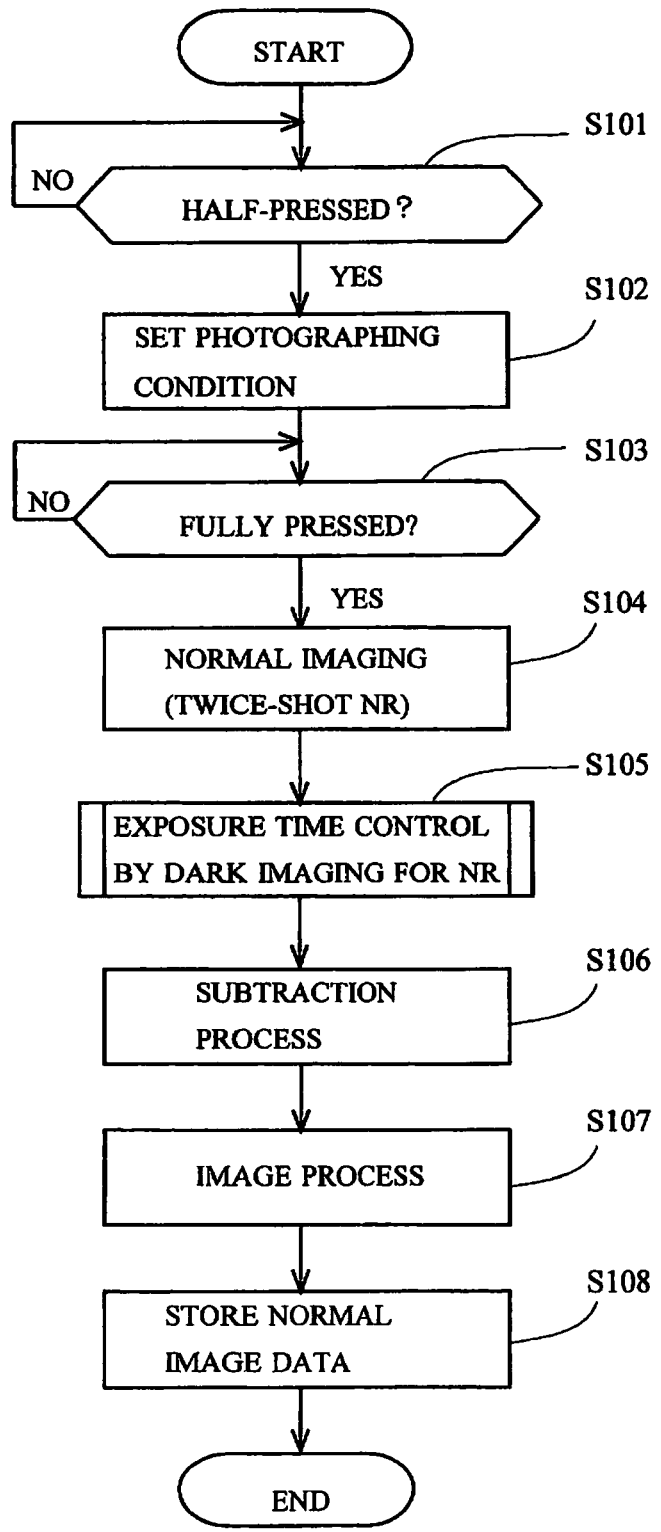
FIG. 2 is a flowchart of a process of a twice-shot NR photographing.

Next, operation examples of the electronic camera in the noise reduction (NR) mode in the present embodiment are described. FIG. 2 is a flowchart of a process of the twice-shot NR photographing. Note that the following description is made on the assumption that the noise reduction (NR) mode is set to be turned on.

Step S101: The CPU 20 judges whether or not the release button is half-pressed, and shifts to step S102 when the release button is half-pressed (step S101: Yes). On the other hand, the CPU 20 repeats the step S101 when the release button is not half-pressed (step S101: No).

Step S102: The CPU 20 performs an automatic focusing, an automatic exposure control, and so on to set photographing conditions used for the photographing of the normal image.

Step S103: The CPU 20 judges whether or not the release button is fully pressed. The CPU 20 repeats the step S103 when the release button is not fully pressed (step S103: No). The CPU 20 shifts to step S104 when the release button is fully pressed (step S103: Yes).

Step S104: The CPU 20 starts the twice-shot NR under the photographing conditions set at the step S102, and first acquires an image data of the normal image. Namely, the CPU 20 sets the mechanical shutter 11 at an open state and drives the timing generator 13. The CPU 20 thereby acquires the image data of the normal image. Incidentally, the data of the normal image acquired by this photographing is stored in the frame memory of the RAM 16 by the image processing section 15 after passing through the AFE 14.

Step S105: The CPU 20 executes a sub-routine for the exposure time control by a dark imaging for NR, subsequent to the normal imaging (details will be described later).

Step S106: The CPU 20 gives instruction to the image processing section 15 to read the data of the dark image after an exposure completion of the dark image is received at the step S105. The image processing section 15 reads the data of the dark image via the AFE 14. Subsequently, the image processing section 15 stores the data of the dark image into the frame memory of the RAM 16. The CPU 20 performs a process to subtract the data of the dark image from the image data of the normal image already stored in the frame memory of the RAM 16.

Step S107: The image processing section 15 performs various image processes such as the white balance and the gradation conversion process for the data of the normal image after the subtraction process is performed at the step S106.

Step S108: The CPU 20 performs a compression process of the data of the normal image which is image-processed at the step S107, and stores the data into the recording medium 23. This process routine is thereby completed.

Next, the sub-routine for the exposure time control by the dark imaging for NR in FIG. 2 (step S105) is described with reference to FIGS. 3A and 3B, FIGS. 4A to 4D, and FIG. 5.

In the present embodiment, the CPU 20 reads the signal level of the dark current component by each OB area (one line) of the dark image to sequentially compare with the signal level of the corresponding OB area of the normal image, in the dark imaging for NR among the twice-shot NR photographing. The CPU 20 controls the exposure time according to the comparison result. Hereinafter, the sub-routine of the exposure time control by the dark imaging for NR is explained after a summary thereof is described.

Figure 3A:
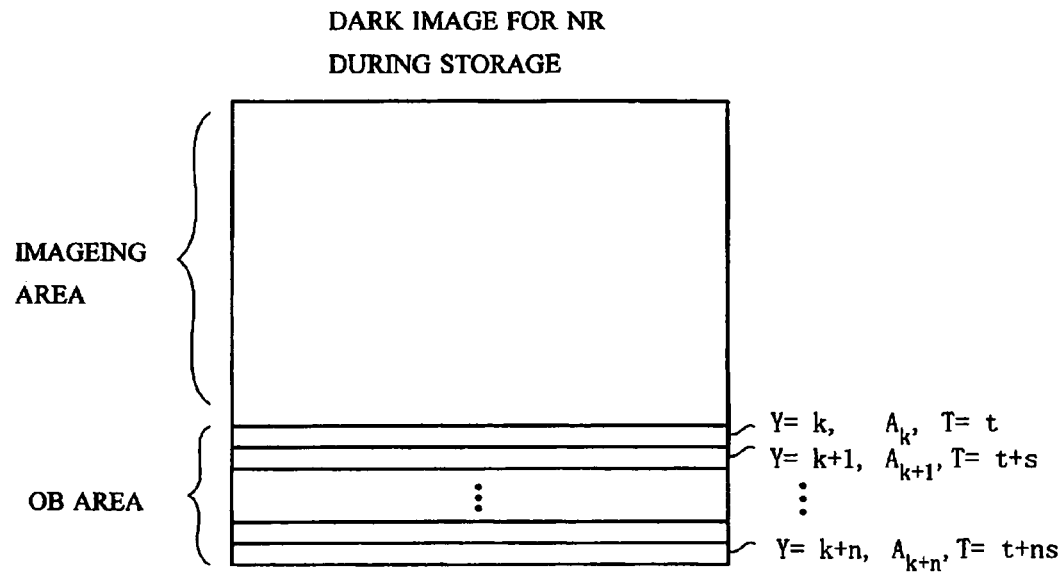
FIGS. 3A and 3B are views to explain a comparison process of average values of signal levels of dark current components.
Figure 3B:
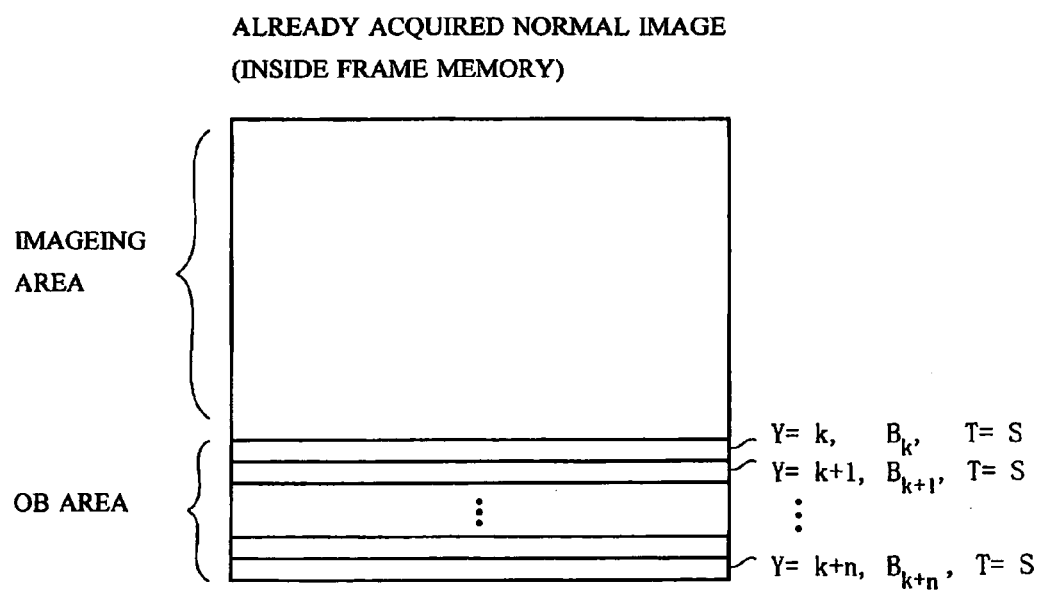

FIGS. 3A and 3B are views to explain a comparison process of average values of the signal levels of the dark current components. FIG. 3A illustrates an addressing order of the OB area of the dark image in the imaging sensor 12 during exposure, and FIG. 3B illustrates an addressing order of the OB area of the normal image-stored at the RAM 16 after the normal imaging. Here, a position (X, Y) of each pixel is specified by an X address for horizontal scanning and a Y address for vertical scanning. In FIGS. 3A and 3B, a position at a right upper limit of the imaging area is set as a base point of the XY address, and the numbers of the Y address are sequentially assigned from the imaging area to the OB area, for simplicity. The Y address at a start of the OB area is set as a start line address "k" (OB area start address). The signal level of one line at the OB area of the dark image is sequentially read by incrementing one line by one line from the start line address "k". A time when the one line at the start line address "k" is read is set as a read start time "t". A cycle to read the signal level of one line by incrementing one line by one line from the start line address "k" is set as a read cycle "s".

In FIGS. 3A and 3B, "T" is a storage time at the exposure time, and "T" represents the storage time from the read start time "t" in case of the dark image (FIG. 3A). In case of the normal image (FIG. 3B), each line becomes "T=S" because "T" corresponds to the normal image exposure time (S). Further, "$A_{k+n}$" represents an average value of the signal levels of the dark current components at the OB area of the dark image, and "$B_{k+n}$" represents an average value of the signal levels of the dark current components at the OB area of the normal image (in which "n" is an integer number from "0" (zero)).

The CPU 20 specifies one line at the OB area of the dark image (Y=k+n address, n="0" (zero)) after the dark imaging is started. Subsequently, the CPU 20 reads the signal levels of the dark current components of respective pixels in the line from the line memory of the RAM 16, and calculates an average value $A_k$ of one line. The CPU 20 reads the signal levels of the dark current components of respective pixels in one line of the OB area at the next line from the line memory of the RAM 16 after "s" seconds has passed from the above-stated reading, and calculates an average value $A_{k+1}$. The CPU 20 repeats this operation by every "s" seconds while shifting the line one by one. Accordingly, the CPU 20 is able to sequentially acquire the average values ($A_k$, $A_{k+1}$, $A_{k+2}$, ... $A_{k+n}$) of the signal levels of the dark current components of one line by every "s" seconds. In this case, the average value is asked from the signal levels of the dark current components of the respective pixels in one line, but a median-filter may be applied for the respective pixels in one line. Note that it is just an example that the average value of the signal levels of the dark current components is asked every one line, and the present embodiment is not limited to the above.

Besides, in the above-stated process, the CPU 20 compares the average value ($A_{k+n}$) of the OB area (one line) of the dark image with the average value ($B_{k+n}$) of the OB area (one line) at the same address of the already acquired normal image, every time when the average value ($A_{k+n}$) is calculated. In the present embodiment, the exposure of the dark image is finished when the following condition is satisfied.

$$|1-((A_{k+n})/(B_{k+n}))| \leq 0.05 \qquad (1)$$

On the other hand, when the above-stated expression (1) is not satisfied, the average value ($A_{k+n}$) of the OB area (one line) of the dark image at the next address and the average value ($B_{k+n}$) at the same address of the normal image are set as comparison objects. Note that this condition is just an example and it is not limited to the condition.

Figure 4A:
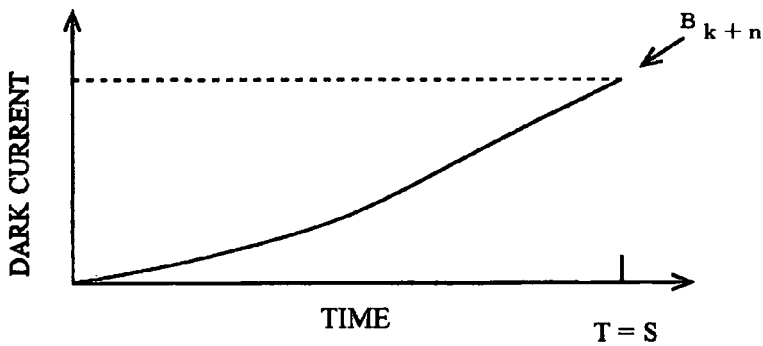
FIGS. 4A to 4D are views to explain an influence of temperature on a dark current.

FIGS. 4A to 4D are views to explain an influence of temperature on the dark current. FIG. 4A is a view illustrating an example of time change of the dark current at the normal image exposure time. The CPU 20 finishes the exposure when the exposure time (T) is "S" seconds. The temperature at this time is "α" [° C.].

Figure 4B:
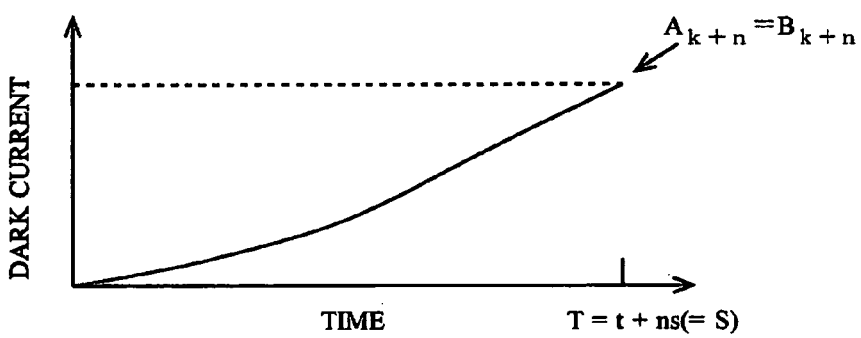
Figure 4C:
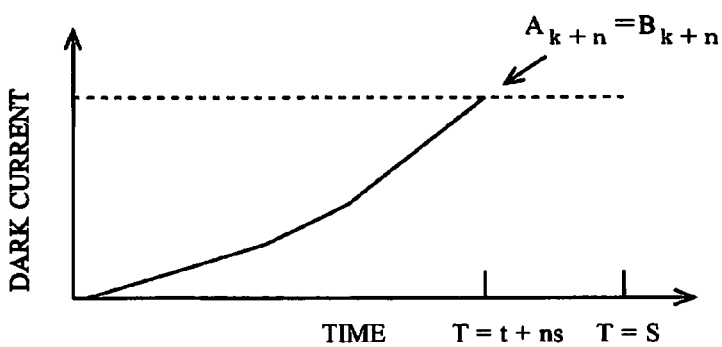
Figure 4D:
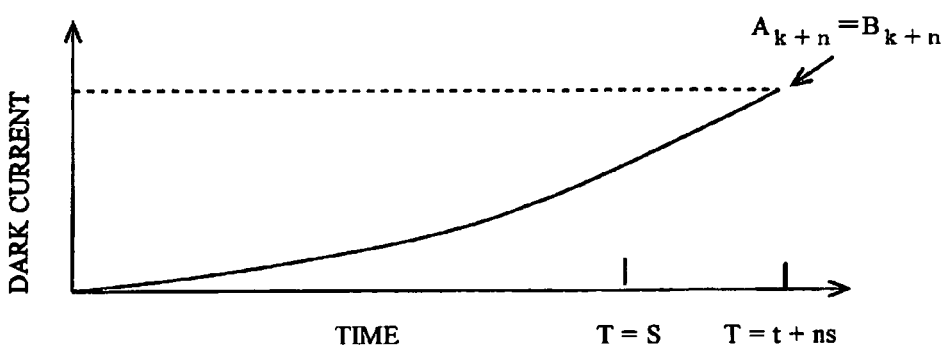

FIGS. 4B to 4D are views illustrating examples of time changes of the dark currents at the dark image exposure time. FIG. 4B illustrates a case when the temperature at the normal image exposure time and the temperature at the dark image exposure time are the same ("α" [° C.]). As illustrated in FIG. 4B, the average value ($A_{k+n}$) of the OB area (one line) of the dark image and the average value ($B_{k+n}$) of the OB area (one line) of the normal image are approximately the same when the exposure time (T) is "S" seconds. In this case, there is no problem because dark current noise is removed if the exposure times of the normal image and the dark image are set to be the same.

FIG. 4C illustrates an example when a rate of temperature rise at the dark image exposure time is larger than a rate at the normal image exposure time. As illustrated in FIG. 4C, the average value ($A_{k+n}$) of the OB area (one line) of the dark image reaches the average value ($B_{k+n}$) of the OB area (one line) of the normal image earlier compared to the exposure time (T=S) of the normal image. In this case, the dark current amount of the dark image becomes larger than the dark current amount of the normal image if the exposure times of the normal image and the dark image are set to be the same. Accordingly, a problem in which a black saturation, the white point, and so on are incurred occurs because the dark current is too much subtracted in the subtraction process. However, in the present embodiment, the CPU 20 finishes the exposure when the average value ($A_{k+n}$) becomes approximately equal to the average value ($B_{k+n}$) based on the above-stated condition (1). Consequently, the problem in which the black saturation, the white point and so on are incurred does not occur.

FIG. 4D illustrates an example of a long time exposure after the live view mode. As illustrated in FIG. 4D, the rate of temperature rise at the dark image exposure time becomes smaller compared to the rate at the normal image exposure time. Accordingly, the average value ($A_{k+n}$) of the OB area (one line) of the dark image reaches the average value ($B_{k+n}$) of the OB area (one line) of the normal image later than the exposure time (T=S) of the normal image. In this case, the dark current amount of the dark image becomes smaller than the dark current amount of the normal image if the exposure times of the normal image and the dark image are set to be the same. As a result, a problem in which the black floating is incurred occurs because a correction amount goes short in the subtraction process. However, in the present embodiment, the CPU 20 finishes the exposure when the average value ($A_{k+n}$) becomes approximately the same as the average value ($B_{k+n}$) based on the above-stated condition (1), and therefore, the problem in which the black floating and so on are incurred does not occur.

Figure 5:
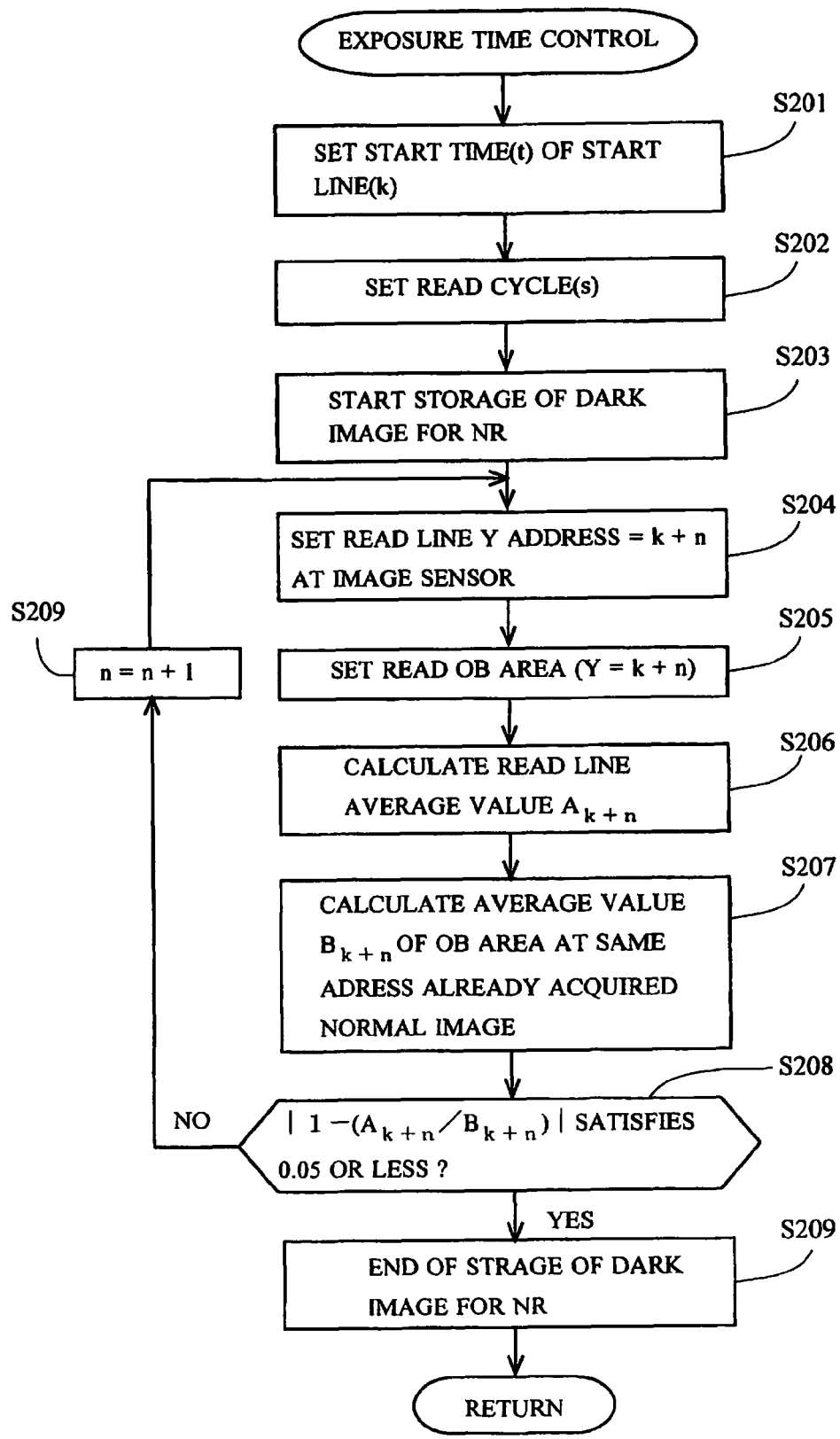
FIG. 5 is a sub-routine of an exposure time control in a noise reduction (NR) mode.

Hereinafter, processes of respective steps of the sub-routine are concretely described. FIG. 5 is a sub-routine of the exposure time control in the noise reduction (NR) mode.

Step S201: The CPU 20 sets the read start time (t) of the start line address "k" at the OB area of the dark image.

Step S202: The CPU 20 sets the read cycle (s). Note that the read start time (t) and the read cycle (s) are set in advance by a program and so on according to the exposure time of the normal image.

Step S203: The CPU 20 performs storage of the dark image for noise reduction (NR). Namely, the CPU 20 keeps the mechanical shutter 11 in a close state and drives the timing generator 13. Accordingly, the storage of the image data of the dark image is started.

Step S204: The CPU 20 sets a Y address (Y=k+n) of the OB area to the imaging sensor 12 as a read line.

Step S205: The CPU 20 gives instruction to the image processing section 15 to read an OB area (one line) from the Y address (Y=k+n) of the OB area of the imaging sensor 12 by every "s" seconds. The image processing section 15 reads the signal levels of the dark current components of the OB area (one line) from the specified Y address (Y=k+n) via the AFE 14, and stores it into the line memory of the RAM 16.

Step S206: The CPU 20 reads the signal levels of the dark current components of the respective pixels in one line stored in the line memory of the RAM 16, and calculates the average value $A_{k+n}$.

Step S207: The CPU 20 specifies the OB area (one line) at the same address of the normal image data stored in the frame memory of the RAM 16. Subsequently, the CPU 20 reads the signal levels of the dark current components of the respective pixels in the line, and calculates the average value $B_{k+n}$.

Step S208: The CPU 20 judges whether or not the value of $|1-((A_{k+n})/(B_{k+n}))|$ satisfies the condition of 0.05 or less. The CPU 20 advances to step S209 when this judging condition is not satisfied (step S208: No), and the CPU 20 returns to the step S204 again after a process of "n=n+1" is performed. On the other hand, the CPU 20 shifts to step S210 when the judging condition is satisfied (step S208: Yes).

Step S210: The CPU 20 finishes the exposure of the dark imaging, and at the same time, finishes the storage of the dark image for the noise reduction (NR). The process of this sub-routine is completed and the CPU 20 returns to the step S106 in FIG. 2. The description of the sub-routine in FIG. 5 is thereby completed.

Incidentally, the CPU 20 may read the signal levels after an arbitrary time (for example, a half time of the normal exposure) has passed from the starting of the dark imaging. The reason why the reading is started after the half time of the normal exposure has passed, is based on the fact that the dark current amount in the exposure of the dark image (dark exposure) is smaller than the dark current amount of the normal exposure at the beginning.

Hereinafter, operation and effect of the present embodiment are described. The electronic camera of the present embodiment switches the first state in which the luminous flux is incident on the light receiving surface of the imaging sensor and the second state in which the luminous flux incident on the light receiving surface is prevented by the mechanical shutter 11. The CPU 20 sequentially compares the signal level of the optical black area of the imaging sensor 12 and the signal level at the corresponding position of the normal image when the dark image is captured to control the dark image exposure time according to the comparison result.

Accordingly, it is possible for the electronic camera of the present embodiment to prevent the image degradation caused by the black saturation, the black floating or the white point even under the environment in which the exposure time becomes long or the temperature changes. Besides, it is possible to prevent the image degradation with high accuracy without performing a process and so on to estimate the temperature rise such as in the conventional example. Further, it is possible to perform the above-stated correction process without providing a temperature sensor.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging device comprising:
    an imaging sensor having an array of light receiving elements that includes an imaging area capturing a subject image and a dark image, and an optical black area in which the light receiving elements are covered with a light shielding member and are grouped into a plurality of portions, the imaging area and the optical black area being two different areas;
    a switching section switching between a first state in which a light is incident on the imaging area and a second state in which the light is prevented from being incident on the imaging area; and
    a controlling section that is configured to:
        read out in the second state at least one second signal level from the plurality of portions of the optical black area when a dark image is being captured in the second state after capturing the subject image and reading out first signal levels from the plurality of portions of the optical black area in the first state;
        compare the at least one second signal level with one of the first signal levels read out from the plurality of portions of the optical black area in the first state, wherein the portion of the optical black area from which the one of the first signal levels has been read out is the same portion from which the at least one second signal level was read out from; and
        control an exposure time to capture the dark image based on the comparison result.

2. The imaging device according to claim 1, wherein the portion of the optical black area from which the one of the first signal levels has been read out is a line of the light receiving elements in the optical black area.

3. The imaging device according to claim 1, wherein the controlling section is configured to complete the exposure to capture the dark image when the at least one second signal level is within a predetermined range compared to the one of the first signal levels.

4. The imaging device according to claim 1, wherein the controlling section is configured to correct the subject image data read out in the first state based on the dark image data read out in the second state.

5. The imaging device according to claim 4, wherein
the controlling section is configured to perform image processing for the corrected subject image data, the image processing including at least one of a white balance and a gradation conversion.

6. The imaging device according to claim 1, wherein
the exposure time to capture the dark image in the second state is different from an exposure time to capture the subject image in the first state.

7. The imaging device according to claim 1, wherein
the one of the first signal levels is an average value of signal levels each read out from the light receiving elements in the portion of the optical black area; and
the at least one second signal level is an average value of signal levels each read out from the light receiving elements in the portion of the optical black area.

8. The imaging device according to claim 1, wherein
the controlling section is configured to read out a plurality of second signal levels sequentially from the plurality of portions of the optical black area until one of the plurality of second signal levels read out has a substantially same signal level as a first signal level to which it is compared.

9. An imaging device comprising:
an imaging sensor having an array of light receiving elements that includes an imaging area capturing a subject image and a dark image, and an optical black area in which the light receiving elements are covered with a light shielding member, the imaging area and the optical black area being two different areas;
a shutter switching between a first state in which a light is incident on the imaging area and a second state in which the light is prevented from being incident on the imaging area; and
a controller that is configured to:
    acquire, in the first state, the subject image from the imaging area and a first signal level from the optical black area;
    acquire, in the second state, a second signal level from the optical black area when a dark image is being captured in the second state after acquiring the subject image and the first signal level from the optical black area;
    compare the second signal level read out from the optical black area in the second state with the first signal level read out from the optical black area in the first state; and
    control, based on the comparison result, an exposure time to capture the dark image in the second state.

10. The imaging device according to claim 9, wherein
the exposure time to capture the dark image in the second state is different from an exposure time to capture the subject image in the first state.

11. The imaging device according to claim 9, wherein
the controller is configured to correct the subject image data acquired in the first state based on the dark image data acquired in the second state.

12. The imaging device according to claim 11, wherein
the controller is configured to perform image processing for the corrected subject image data, the image processing including at least one of a white balance and a gradation conversion.

13. A method of acquiring an image data with an imaging sensor having an array of light receiving elements, the array including an imaging area capturing a subject image and a dark image, and an optical black area in which the light receiving elements are covered with a light shielding member and grouped into a plurality of portions, the imaging area and the optical black area being two different areas, the method comprising:
    reading out first signal levels from the plurality of portions of the optical black area in a first state in which a light is incident on the imaging area;
    reading out a second signal level from the plurality of portions of the optical area when the dark image is being captured in a second state in which the light is prevented from being incident on the imaging area after reading out the first signal levels from the plurality of portions of the optical black area in the first state;
    comparing the second signal level with one of the first signal levels read out from the plurality of portions of the optical black area in the first state, wherein the portion of the optical black area from which the one of the first signal levels has been read is the same portion from which the second signal level was read out from; and
    controlling an exposure time to capture the dark image based on the comparison result.

14. The method of acquiring an image data according to claim 13, wherein
the portion of the optical black area from which the one of the first signal levels has been read out is a line of the light receiving elements in the optical black area.

15. The method of acquiring an image data according to claim 13, wherein
the step of controlling an exposure time completes the exposure to capture the dark image when the second signal level is within a predetermined range compared to the one of the first signal levels.

16. The method of acquiring an image data according to claim 13, further comprising:
    correcting the subject image data read out in the first state based on the dark image data read out in the second state.

17. The method of acquiring an image data according to claim 16, further comprising:
    performing image processing for the corrected subject image data, the image processing including at least one of a white balance and a gradation conversion.

18. The method of acquiring an image data according to claim 13, wherein
the step of controlling an exposure time makes the exposure time to capture the dark image in the second state different from an exposure time to capture the subject image in the first state.

19. The method of acquiring an image data according to claim 13, wherein
the one of the first signal levels is an average value of signal levels each read out from the light receiving elements in the portion of the optical black area; and
the second signal level is an average value of signal levels each read out from the light receiving elements in the portion of the optical black area.

20. The method of acquiring an image data according to claim 13, wherein
in the step of comparing the second signal level with the one of the first signal levels, when the comparison result is that the second signal level is not substantially the same signal level as the one of the first signal level, the step of comparing further comprises:
    reading out, in the second state, an other second signal level from the plurality of portions of the optical black area except the portion of the optical black area from which the second signal level previously has been read out;
    comparing the other second signal level with an other one of the first signal levels read out from the plurality of portions of the optical black area except the portion of the optical black area from which the one of the first signal levels was read out, wherein the portion of the optical black area from which the other one of the first signal levels has been read out is the same portion from which the other second signal level was read out from; and reiterating the steps of the reading out an other second signals level and the step of comparing the other second signal with an other one of the first signal levels until the other second signal level read out has a substantially same signal level as the other one of the first signal levels to which it is compared, wherein the step of controlling an exposure time completes the exposure to capture the dark image when the other second signal level is substantially the same signal level as the other one of the first signal levels to which it is compared.

* * * * *